United States Patent [19]

Hale

[11] Patent Number: 5,232,117
[45] Date of Patent: Aug. 3, 1993

[54] REUSABLE METAL DRUM

[75] Inventor: James A. Hale, Cullman, Ala.

[73] Assignee: Greif Bros. Corporation, Delaware, Ohio

[21] Appl. No.: 867,821

[22] Filed: Apr. 13, 1992

[51] Int. Cl.$^5$ ............................................... B65D 25/16
[52] U.S. Cl. ........................................ 220/404; 220/461
[58] Field of Search .............. 220/404, 403, 460, 461, 220/470, 4.04, 400, 404, 461

[56] References Cited

U.S. PATENT DOCUMENTS

| | | | |
|---|---|---|---|
| 1,591,373 | 7/1926 | Griffiths | 220/461 |
| 1,944,042 | 1/1984 | Thompson | 220/466 |
| 1,959,120 | 8/1934 | Coakley | 220/466 |
| 2,025,932 | 12/1935 | Beldin | 220/404 |
| 2,200,200 | 5/1940 | Donnelly | 220/404 |
| 2,511,481 | 6/1950 | Schneider | 220/461 |
| 2,721,674 | 10/1955 | Lazard | 220/461 |
| 2,727,673 | 12/1955 | Bergstrom | 220/461 X |
| 2,814,714 | 11/1957 | Nallinger | 220/65 |
| 2,861,714 | 11/1958 | Glossop | 220/461 |
| 3,158,311 | 11/1964 | Thompson | 220/404 X |
| 3,266,390 | 8/1966 | Carpenter, Jr. | 220/460 X |
| 3,443,735 | 5/1969 | Meijers | 220/461 |
| 4,347,948 | 9/1982 | Hamada et al. | 220/404 |
| 4,666,041 | 5/1987 | Gordon | 206/522 |

Primary Examiner—Steven M. Pollard
Attorney, Agent, or Firm—Kane, Dalsimer, Sullivan, Kurucz, Levy, Eisele and Richard

[57] ABSTRACT

A metal drum and the method of making the same having a detachable lining removable therefrom after a first use to allow for the reuse or recycling of the drum.

7 Claims, 6 Drawing Sheets

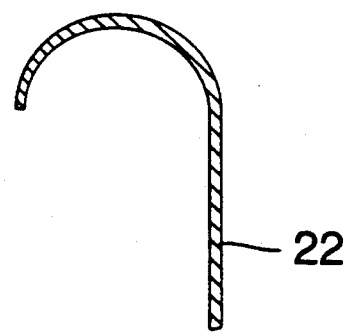
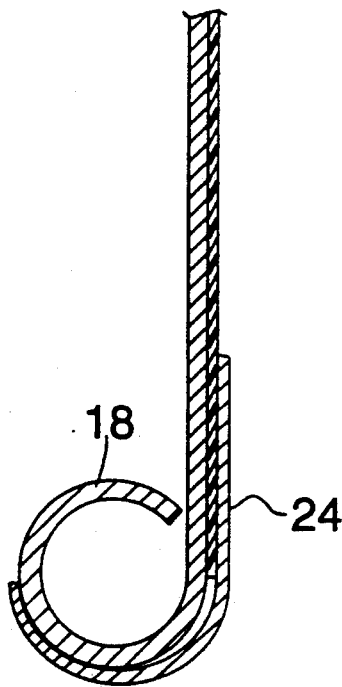
FIG.2
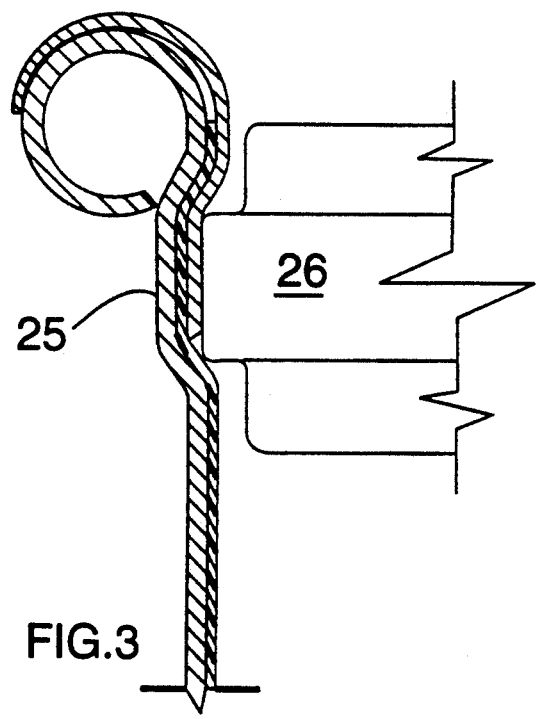
FIG.3

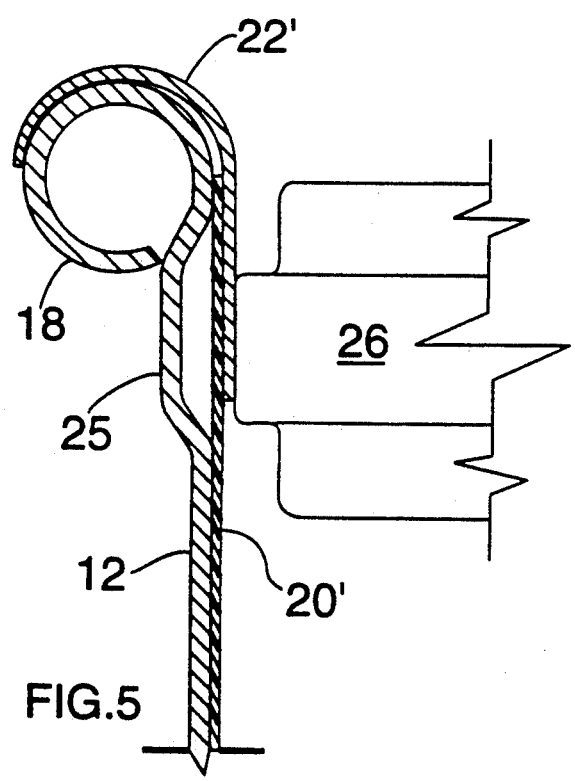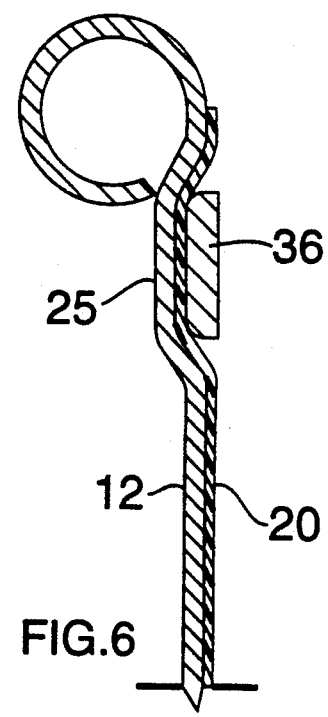

REUSABLE METAL DRUM

BACKGROUND OF THE INVENTION

1. Field of Invention

This invention relates to a drum used for transporting goods, and more particularly to a steel drum for containing material including liquid or semi-liquid materials which is reusable and/or recyclicable.

2. Description of Prior Art

Cylindrical containers such as steel drums have been used for a long time as a means of storing or transporting a variety of materials including powdery or granular solids, or liquids and semi liquids. These containers are built to withstand the exigencies of transit. The materials stored in them are removed by first removing the top of the containers and then pouring or pumping the materials out.

Drums are sometimes used to store so-called semi-liquid materials such as adhesives, lubricants, hazardous material or other material that would contaminate or leave contaminants on the interior surface thereof. This may involve materials which are basically meltable plastics which may be poured therein. These materials solidify upon cooling. To remove the material one uses a machine with a plunger, which is heated and equipped with an "O" ring type of seal. After removing the top cover, and disc seal, the drum is ready for emptying the contents. As the plunger is pushed downwardly into the drum, the heater melts and liquifies the materials and as the plunger moves downwardly, the material is pumped out through the plunger and put into the manufacturing process.

When the plunger gets toward the bottom of the drum, there remains a small amount of material which cannot be pumped out but is left in the bottom of the container after the plunger heating system has been removed. Such drums are normally used once and then discarded since the interior has become contaminated with the material it contained. Disposal and even recycling of such drums because of this is difficult. It has become desirable to provide drums however that may be reused or subject to recycling.

Moreover, steel drums are typically made of a heavy gauge metal and are relatively expensive. In view of the shipped material contaminating the interior surface of the drum, reuse is not possible, recycling is difficult and disposal may require special handling.

OBJECTIVES AND SUMMARY OF THE INVENTION

It is therefore a principle object of the invention to provide for a steel drum which is reusable and/or constructed such that it facilitates recycling.

Other objectives and advantages of the invention shall become apparent in the description of the invention.

The above objectives are attained by a metal (steel) drum having a straight sidewall steel shell open at both ends, a curl portion at each end. The drum is formed with a special liner which becomes the removable element. In this regard, the liner comprises a fibre stock silicone-coated sheet which is positioned around the inside surface of the drum. This sheet may also be foil parchment, a wax covered etc. depending upon its compatibility with the contents. Metal chimes are placed on the top and bottom to hold the liner in place and lined covers are fastened. The drum can now be used to contain a wide variety of material. If after use the end user wishes to reuse the drum for a different product the top and bottom covers are removed. To remove the lining, the top and bottom chimes are removed. It is now possible to lift out the lining which may be disposed of and the lining replaced and chimes added. The covers which may be similarly lined with a removable portion which is stripped therefrom and replaced with the covers reattached. The drum could now be used to contain other material.

BRIEF DESCRIPTION OF THE DRAWINGS

Thus by the present invention, its objects and advantages will be realized, the description of which should be taken in conjunction with the drawings wherein:

FIG. 2 shows a sectional somewhat exploded view of the reusable drum incorporating the teachings of the present invention;

FIG. 3 shows a sectional view of the upper portion of the reusable drum showing a metal chime being placed thereon, incorporating the teachings of the present invention;

FIG. 5 shows a sectional view of the reusable drum having a replaced lining therein, incorporating the teachings of the present invention;

FIG. 6 shows a sectional view of the reusable drum having an alternate chime arrangement, incorporating the teachings of the present invention.

DETAILED DESCRIPTION OF THE PREFERRED EMBODIMENT

Figure 1:
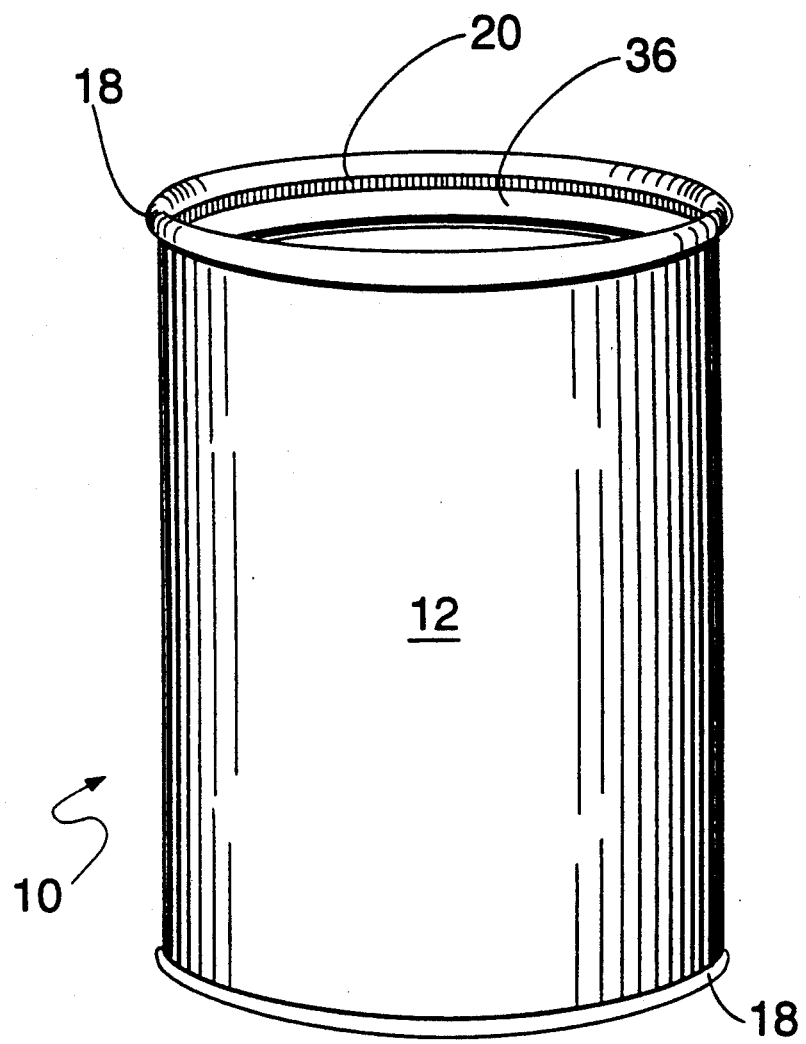
FIG. 1 is a perspective view of a reusable drum incorporating the teachings of the present invention.

Turning now more particularly to the drawings, there is shown a drum 10 which comprises a cylindrical shell 12 made out of metal such as heavy gauge steel. The drum 10 includes two detachable covers 14 and 16 which are affixed to the shell 12 by way of locking rings.

The drum 10 illustrated may be used to contain a liquid or semi-liquid material which is extracted therefrom by way of a plunger device such as that illustrated in U.S. Pat. No. 3,412,903 to Van Riper Jr. The top and bottom of shell 12 terminate in a rolled edge or curl 18 to which a cover is affixed as will be discussed. Disposed about the internal surface of shell 12 is a liner 20 which may be made of silicone coated fibre or any other material suitable for purpose. The liner 20 should be impermeable to the material to be contained by the drum 10. If the liner 20 is in the form of a sheet then the ends thereof can be taped together.

Once the liner 20 is in place then it is held in position by way of the following. As shown in FIGS. 2 and 3, metal chimes 22 and 24 are positioned on the curl 18 and extend into the shell's interior and over a portion of liner 20. At this point an expanding block 26, which is generally illustrated in FIG. 3, crimps the assembled components together expanding the chimes 22 and 24, liner 20 and shell 12 outwardly as shown in FIG. 3 forming an offset 25 in the shell 12. This secures the liner 20 to the inside of shell 12.

Figure 4A:
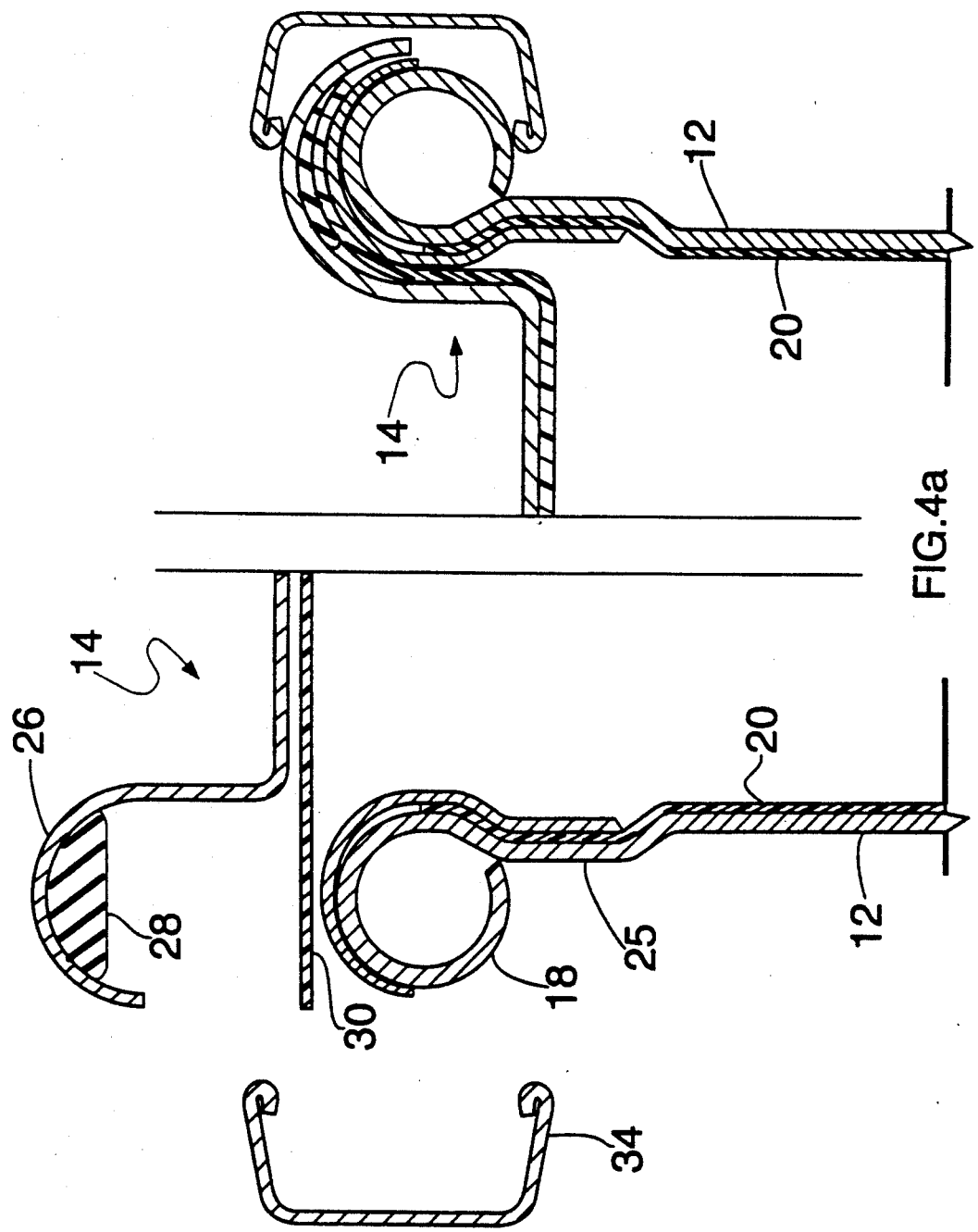
FIGS. 4a & 4b show a sectional view of the reusable drum prior to and after affixing covers thereon, incorporating the teachings of the present invention.
Figure 4B:
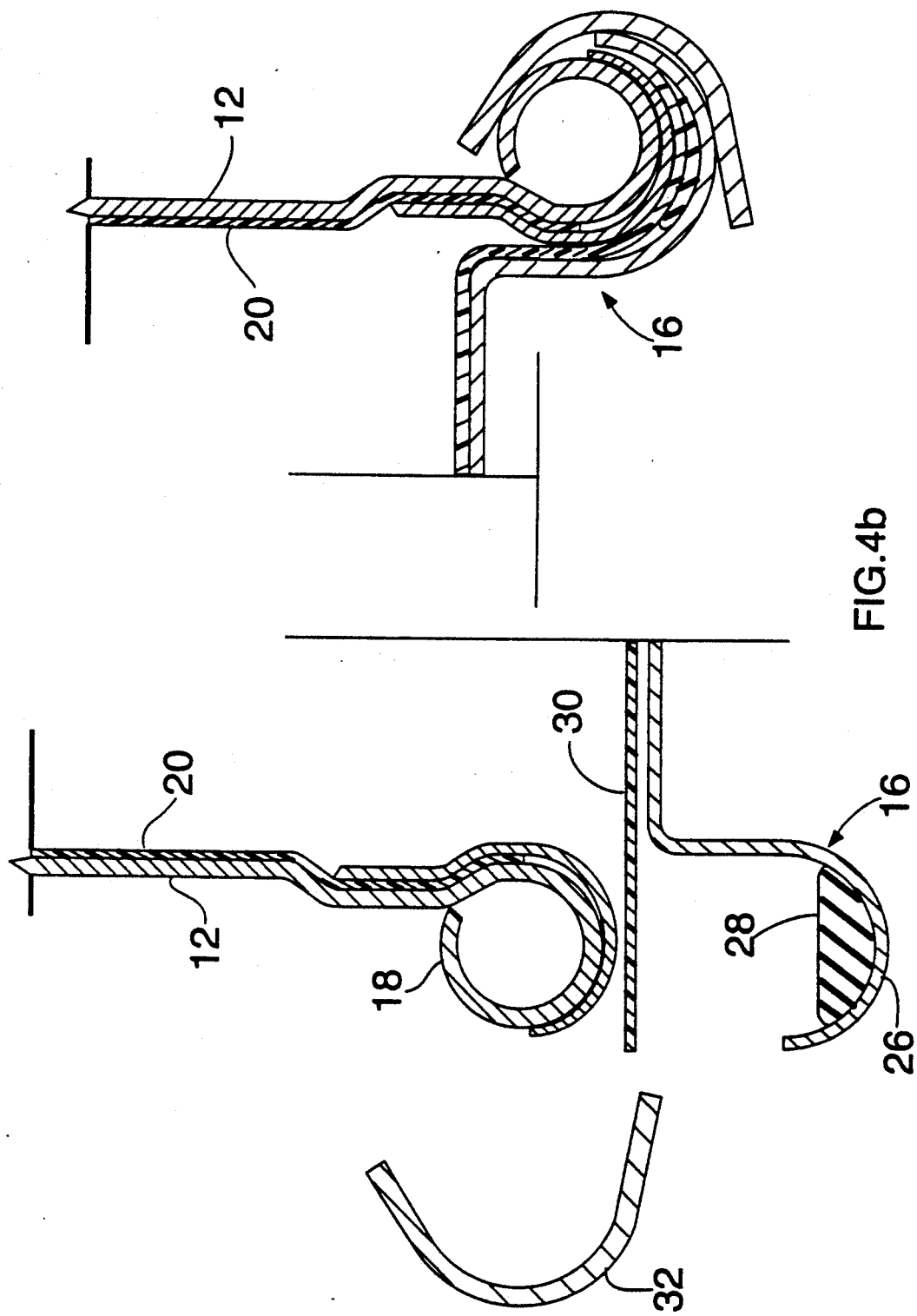

At this point covers 14 and 16 may be affixed as shown in FIGS. 4a and 4b. In this regard covers 14 and 16 are made of metal and are disk shaped having a loop portion 26 about their periphery. Portion 26 includes a gasket 28 and is adapted to fit over the respective chimes and curl 18 of the shell 12 as shown in FIGS. 4a & 4b. Prior to attaching the covers 14 and 16, a sealing disc 30 is provided, which again may be silicone coated fibre. As can be seen in the figures, disc 30 adapts to the shape of portion 26 and curl 18 upon securing the covers to the shell.

The bottom cover 16 may be affixed by way of a bolted closing ring 32. The top cover 14 may be removably attached to the top of the shell 12 by way of a closing ring 34 which is more readily opened so that the material to be contained can be placed therein and accessed easily. Thus with the foregoing arrangement the entire interior surface of drum 10 is prevented from contacting the contained material.

Once the drum 10 is depleted of its material, to reuse the drum the following steps are taken. Remove the top and bottom covers 14 and 16 and discard sealing disks 30 replacing them with fresh disks. By removing chimes 22 and 24, the liner 20 can then be removed and disposed of. The shell interior is now fresh and uncontaminated. A new liner 20' can then be placed in the interior with new chimes 22' and 24' (22' only shown in FIGS. 5 and 6) crimped into the existing offsets 25 securing the new liner 20' to the shell 12. The covers 14 and 16 with new sealing disk can then be attached. The drum 10 now has a completely clean interior that can be used to contain new material, thus readily allowing the reuse of the metal drum. Alternatively, if the lining is not going to be replaced, it can be removed and disposed of properly. The steel drum can be separately disposed of and/or recycled without the degree of handling required by the liner since the former is free of contaminants.

Figure 7:
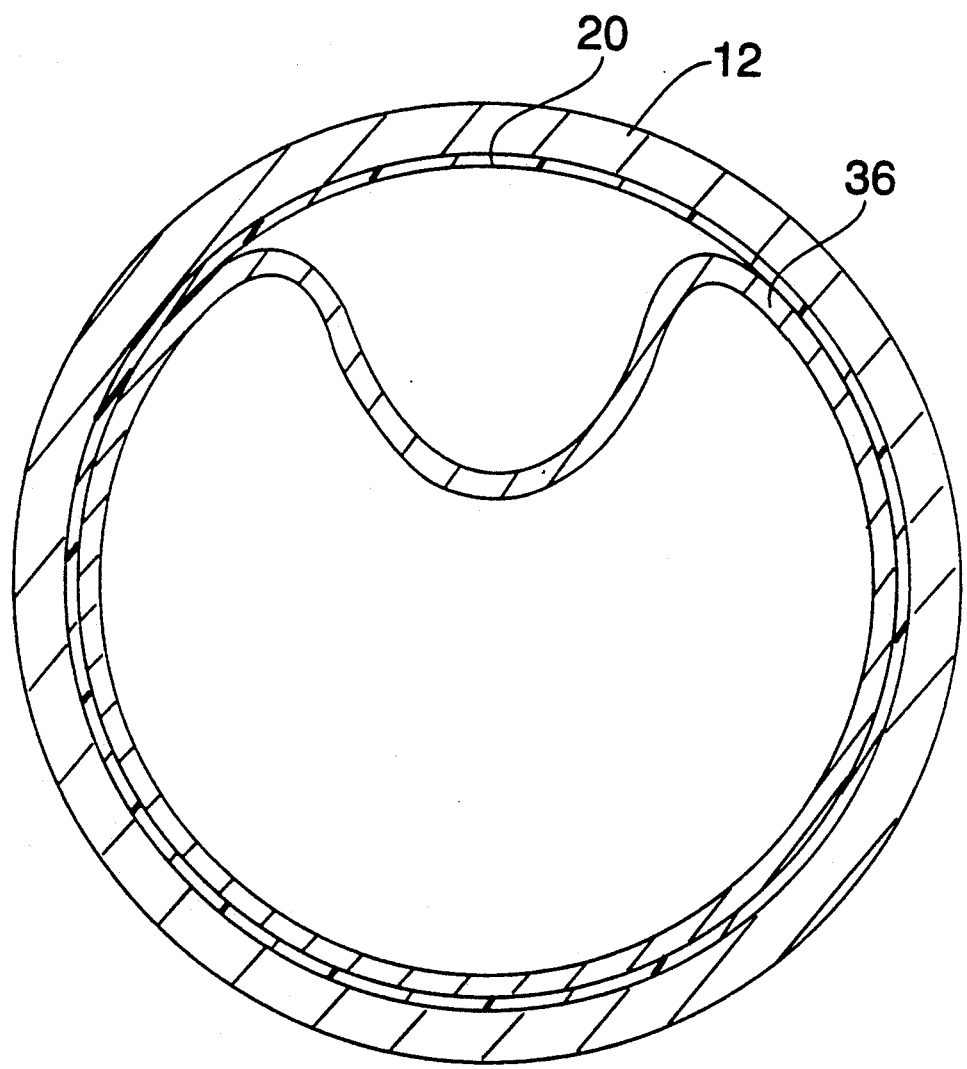
FIG. 7 is a top sectional view of the reusable drum showing removal of the chime, incorporating the teachings of the present invention.

Turning now to FIGS. 6 and 7, in this embodiment a flat steel chime 36 is used. In this regard, after the liner 20 is placed on the shell's 12 interior, the flat chime 36 is expanded outward as before along with a portion of the steel shell 12 to create the offset 25. This would be done adjacent to the top and bottom of the shell 12. The covers 14 and 16 would be of the same construction and would be attached as before.

To remove the flat chime 36, it is forced away from the shell 12 as shown in FIG. 7, and lifted out. With both chimes removed the liner 20 can be replaced. New flat chimes 36 can be placed or snapped against the replacement liner in the offsets 25 at each end of the shell 12. These new chimes 36 can be expanded outward as is necessary to secure the new liner to the shell 12. The liners of the covers are replaced and reattached to the shell completing the drum.

Thus by the present invention its objects and advantages are realized and although preferred embodiments have been disclosed and described in detail herein its scope should not be limited thereby rather its scope should be determined by that of the appended claims.

What is claimed is:

1. A reusable drum comprising:
   a metal cylindrical shell having a cylindrical side wall, open ends and an interior surface; a liner to be disposed over substantially all of the interior surface, said liner being impervious to the passage of material being contained in the drums;
   metallic chimes secured to said ends maintaining said liner on the interior surface;
   said chimes having a portion extending axially away from said ends along said interior surface of said shell, said portion being deformed radially outwardly from said ends; wherein said side wall terminates in a curl and said chimes comprise a flat portion which engages the liner and rolled lip which is adapted to fit over a portion of the curl with the chime being secured to the sidewall by expanding said chime, liner, and sidewall outward and
   wherein by removing said chimes allows for the removal of said liner from the shell and allows for a fresh liner to be placed on the interior surface.

2. The drum in accordance with claim 1 wherein said liner comprises coated fibre.

3. The drum in accordance with claim 2, wherein said liner is coated with a substantially impervious material such as plastic, foil, parchment, silicone or wax.

4. The drum in accordance with claim 1, wherein said drum includes bottom and top metal covers having respective detachable disk shaped liners.

5. A method of making a lined metal drum comprising the steps of:
   providing a metal cylindrical shell having a cylindrical sidewall terminated in a curl, open ends and an interior surface; providing a liner and forming it into a cylindrical shape which defines the interior cylindrical portion of the drum providing metal chimes comprising a flat portion which engages the liner and a rolled lip which is adapted to fit over a portion of the curl; attaching metal chimes extending axially away from said open ends along said interior surface of said shell to the open ends of the shell by expanding said chime, liner and a portion of the sidewall outward maintaining said liner on the interior surface; deforming said chimes radially outwardly from said open ends; providing detachable lined metal covers at each open end; and wherein when the drum is emptied of material the liner can be replaced by removing the chimes and then the liner with a new liner being placed on the shell interior and metal chimes secured at either end.

6. The method in accordance with claim 5, which includes the step of forming said liner out of fibre with a substantially impervious coating such as plastic, foil, parchment, silicone or wax.

7. The method in accordance with claim 6, which includes the step of providing liners for the covers constructed in substantially the same cross section as the liner used on cylindrical shell.

* * * * *